No. 770,088. PATENTED SEPT. 13, 1904.
I. N. MOORE.
VALVE.
APPLICATION FILED JULY 1, 1904.
NO MODEL.
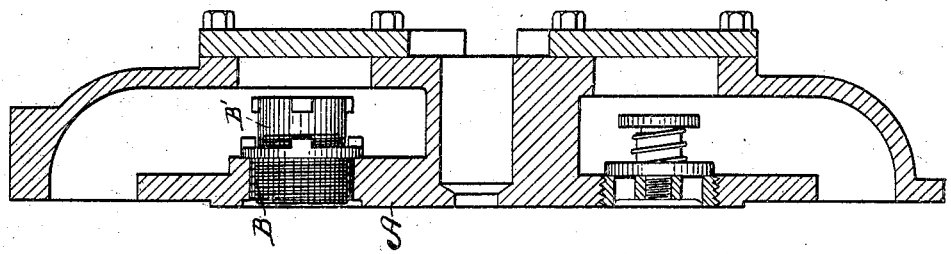
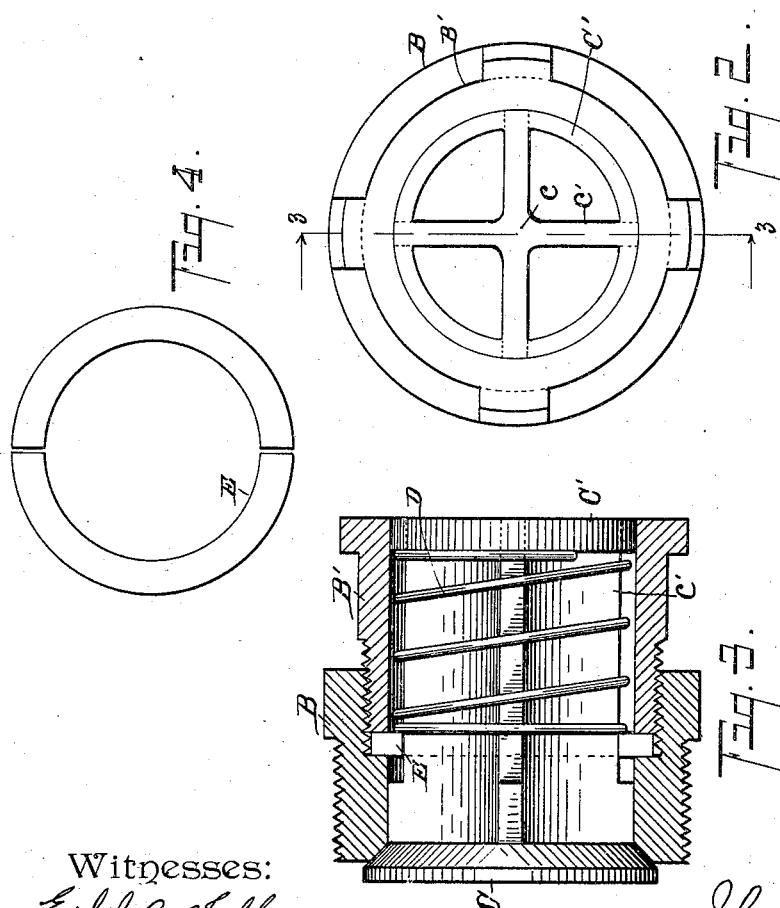
Witnesses:
Inventor,
Ila N. Moore
By Fred L. Chappell
Att'y.

No. 770,088. Patented September 13, 1904.

UNITED STATES PATENT OFFICE.

ILA N. MOORE, OF BATTLECREEK, MICHIGAN.

VALVE.

SPECIFICATION forming part of Letters Patent No. 770,088, dated September 13, 1904.

Application filed July 1, 1904. Serial No. 214,922. (No model.)

*To all whom it may concern:*

Be it known that I, ILA N. MOORE, a citizen of the United States, residing at the city of Battlecreek, county of Calhoun, State of Michigan, have invented certain new and useful Improvements in Valves, of which the following is a specification.

This invention relates to improvements in valves.

My improved valve is particularly adapted for use as an intake-valve for air or gas compressor cylinders, and I have illustrated and described it in that relation herein, although it is desirable for use in other relations.

Much difficulty has heretofore been experienced in producing satisfactory intake-valves for use on air and gas compressors and the like, as owing to the great amount of work done thereby the valves in general use in that relation very soon get out of repair, very frequently causing serious injury to the apparatus.

The objects of this invention are: first, to provide an improved valve that is adapted for use as an intake-valve for air or gas compressors or the like, which is assembled without the use of bolts, nuts, or screws; second, to provide an improved valve adapted to perform very heavy work without liability of getting out of repair, the parts of which are simple and economical in structure and easily assembled.

Further objects and objects relating to structural details will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings, forming a part of this specification, in which—

Figure 1 is a cross-sectional view through the cylinder-head of an air or gas compressor with my improved valve in position therein. Fig. 2 is a plan view of my improved valve looking from the outer end thereof. Fig. 3 is a detail cross-sectional view thereof, taken on a line corresponding to line 3 3 of Fig. 2 looking in the direction of the little arrows at the ends of the section-line. Fig. 4 is a plan view of the retaining-ring E for the valve.

In the drawings similar letters of reference refer to similar parts throughout the several views.

Referring to the drawings, A represents the head of an air or gas compressor cylinder. The valve-casing is made up of open-ended cylindrical sections B and B'. The section B is the inner section of the casing and is provided with external screw-threads at its inner ends, whereby it is secured in position in a suitable threaded opening in the cylinder-head. The casing-section B is enlarged at its outer end to receive the outer casing-section B', which is screw-threaded therein. The inner section is provided with a suitable valve-seat at its inner end and with an annular shoulder or seat $b$ for the ring E, the purpose of which will be hereinafter pointed out. The valve C is provided with a stem $c$, which is formed integral therewith. The valve-stem $c$ is provided with radial web-like projections $c'$. These projections $c'$ fit loosely within the casing at their inner ends to guide the valve into its seat, but are cut away, as at $c''$, toward their outer ends. A ring C', adapted to loosely fit within the valve-casing, so as to reciprocate freely therein, is formed on the web extensions of the valve-stem at their outer ends. A coiled spring D is arranged upon the valve-stem, as clearly appears in Fig. 3, one end bearing against the ring C' and the other against the ring E. This ring E projects into the casing sufficiently to serve as a stop for the ring C', thereby preventing the removal of the valve from the casing when the ring E is in position. The ring is held in position by the outer casing-section B', which screws down upon it. This ring E is made up of segments, so that it may be put in position after the valve-stem is inserted through the valve-casing section B. The spring D is then placed upon the stem, and the outer casing-section B' screwed into position. The valve is thus free to reciprocate, and it is impossible for it to be entirely withdrawn from the casing on account of the ring E engaging the ring of the valve-stem. I am thus enabled to do away with any screws or nuts as a part of the valve. This is of very great advantage in such structures as air or gas compressors, as the valves therein are required to perform very heavy work, the vibration of the valve quickly loosening the parts if they are put together with bolts, nuts, or screws. In my improved valve the movable parts are secured without resorting to such means. The parts of my improved valve are also economical in structure and are easily assembled. I have illustrated and described the same in the form preferred by me on account of its structural simplicity and economy, although I am aware that it is capable of considerable structural variation without departing from my invention.

Having thus described my invention, what I claim as new, and desire to secure by Letters Patent, is—

1. The combination with an air or gas compressor cylinder, of a valve-casing made up of an inner section having a valve-seat at its inner end and an internal seat or shoulder; an outer section screw-threaded into said inner section; a ring made up of segments clamped between said shoulder in said inner section and the inner end of said outer section; a valve having a stem with radial web-like projections thereon, said projections fitting loosely within said valve-casing at its inner end; a ring fitting loosely within said valve-casing, the same being a part of the valve-stem at its outer end; and a coiled spring arranged on said stem bearing against said ring in said casing and the ring on said stem, for the purpose specified.

2. The combination with an air or gas compressor cylinder, of a valve-casing made up of an inner section having a valve-seat at its inner end and an internal seat or shoulder; an outer section screw-threaded into said inner section; a ring made up of segments clamped between said shoulder in said inner section and the inner end of said outer section; a valve having a stem with radial web-like projections thereon; a ring fitting loosely within said valve-casing and being a part of the valve-stem at its outer end; and a coiled spring arranged on said stem, bearing against said ring in said casing and the ring on said stem, for the purpose specified.

3. The combination with an air or gas compressor cylinder, of a valve-casing made up of an inner section having a valve-seat at its inner end and an internal seat or shoulder; an outer section screw-threaded into said inner section; a ring made up of segments clamped between said seat or shoulder in said inner section and the inner end of said outer section; a valve; a stem therefor; a head on said stem fitting loosely within said valve-casing; and a coiled spring arranged on said stem bearing against said ring in said casing and said head on said valve-stem, for the purpose specified.

4. The combination with an air or gas compressor cylinder, of a valve-casing made up of an inner section having a valve-seat at its inner end and an internal seat or shoulder; an outer section screw-threaded into said inner section; a ring made up of segments clamped between said seat or shoulder in said inner section and the inner end of said outer section; a valve; a stem therefor; a head on said stem fitting loosely within said valve-casing; and a return-spring for said valve, for the purpose specified.

5. The combination with an air or gas compressor cylinder, of a valve-casing made up of an inner section having a valve-seat at its inner end and an internal seat or shoulder; an outer section screw-threaded into said inner section; a ring made up of segments clamped between said seat or shoulder in said inner section and the inner end of said outer section; a valve; a stem therefor; and a coiled spring arranged on said stem bearing against said ring in said casing, for the purpose specified.

6. In a valve, the combination of a casing made up of an inner section having a valve-seat therein; a ring made up of segments; an outer section screw-threaded into said inner section adapted to retain said ring in position; a valve; a stem therefor; a head on said valve-stem fitting loosely within said valve-casing; and a return-spring for said valve, for the purpose specified.

7. In a valve, the combination of a casing made up of an inner section having a valve-seat therein; a ring made up of segments; an outer section screw-threaded into said inner section adapted to retain said ring in position; a valve; a stem therefor; a head on said valve-stem fitting loosely within said valve-casing, for the purpose specified.

8. In a valve, the combination of a casing made up of an inner section having a suitable valve-seat therein; a valve; a stem therefor; a head on said stem; stops arranged within said inner valve-casing section; a spring on said valve-stem adapted to rest against said stops; and an outer valve-casing section screw-threaded into said inner valve-casing section, adapted to retain said stops in position, for the purpose specified.

9. In a valve, the combination of a casing made up of an inner section having a suitable valve-seat therein; a valve; a stem therefor; a head on said stem; stops arranged within said inner valve-casing section; and an outer valve-casing section screw-threaded into said inner valve-casing section, adapted to retain said stops in position, for the purpose specified.

In witness whereof I have hereunto set my hand and seal in the presence of two witnesses.

ILA N. MOORE. [L. S.]

Witnesses:
EDWARD REEVES,
EARL P. SOUTHARD.